3,606,573
POROUS LAMINATE
Calvin W. Emmerson, Mooresville, and Jack E. White, Indianapolis, Ind., assignors to General Motors Corporation, Detroit, Mich.
Filed Aug. 15, 1969, Ser. No. 850,567
Int. Cl. F01d 5/08
U.S. Cl. 416—90
11 Claims

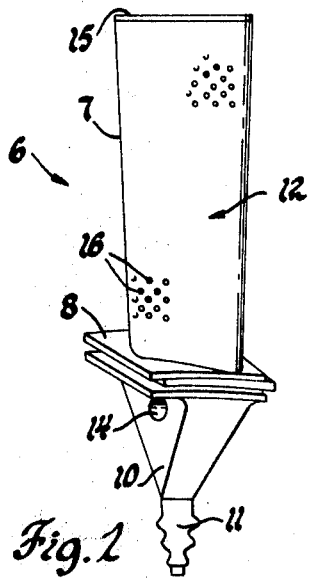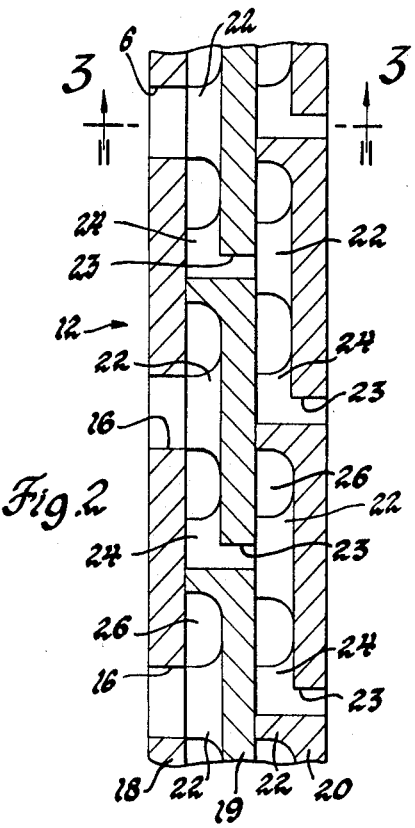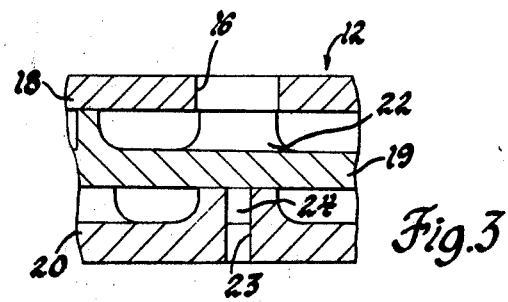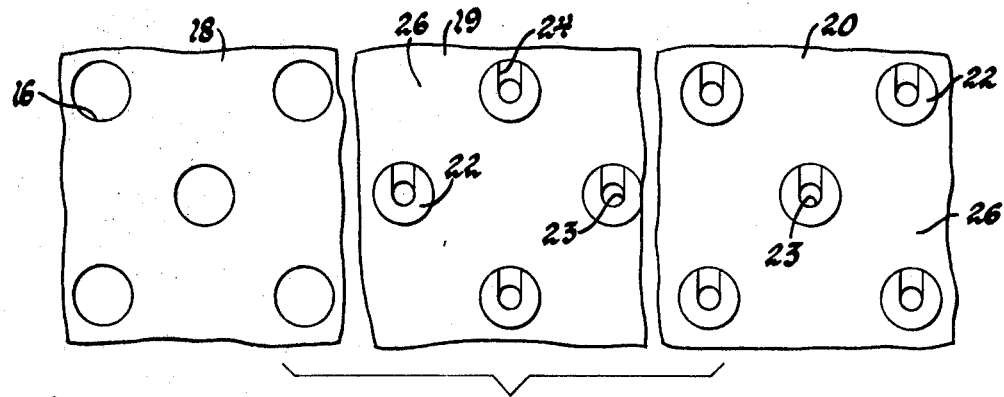
INVENTORS
Calvin W. Emmerson &
BY Jack E. White
Paul Fitzpatrick
ATTORNEY

United States Patent Office 3,606,573
Patented Sept. 20, 1971

ABSTRACT OF THE DISCLOSURE

A porous sheet adapted for transpiration cooling, as in turbine blades, is made up of plural layers of metal bonded together with bosses projecting from the surfaces of the layers to create a space or passage between layers and with pores through the layers, the pores in each layer being out of register with those in the adjacent layer or layers. The pores extend through the sides of the bosses thus reducing the mass of the bosses and facilitating control of the permeability of the sheet.

---

The invention herein described was made in the course of work under a contract or subcontract thereunder with the Department of Defense.

Our invention relates to laminated porous structures of controlled porosity such as are particularly adapted for transpiration cooling. Our invention is particularly useful when employed as the metal laminate in devices such as turbine blades and vanes and other high temperature components of gas turbine and other engines which are in need of cooling to withstand high temperatures.

It has long been recognized that the performance and efficiency of gas turbine engines, as well as other types of engine, may be increased by raising the temperature of the motive fluid. This, because of the inherent limitations of metals available, has led to increasingly sophisticated refinements in arrangements for cooling the surfaces exposed to hot fluids. One very promising mode of cooling is transpiration cooling, and particularly transpiration cooling embodying the principles described in prior patent applications, of common ownership with this application, Ser. No. 526,207 of Bratkovich and Meginnis for Laminated Porous Metal, filed Feb. 9, 1966; Ser. No. 691,834 of Emmerson for Turbine Cooling, filed Dec. 19, 1967; Ser. No. 707,556 of Helms for Turbine Blade, filed Feb. 23, 1968; Ser. No. 742,900 of Meginnis for Turbine Blade, filed July 5, 1968; and Ser. No. 762,411 of Helms for Cooled Blade, filed Sept. 25, 1968.

In general, all of these structures involve a laminate made up usually of three or more thin layers of high temperature resistant metal, the layers being etched to provide bosses or other relief on the surfaces so that flow can occur between the layers parallel to the layers and also etched to provide pores through the layers. Cooling air flows from the inside of the sheet successively through the pores in the layers to the outer surface of the sheet, with flow occurring parallel to the surface between the layers as well as through the layers.

In an apparatus such as a turbine blade which is subjected to high centrifugal forces, these forces must be taken through the individual layers. The bosses extending from them to space the layers do not contribute to the tensile strength of the blade, although they do add mass and, therefore, stress. Another important consideration with respect particularly to devices such as turbine vanes and blades is that the need for cooling may vary over the surface of the blade or vane airfoil, and also the external pressure varies from area to area, presenting a very considerable problem in achieving the desired distribution of cooling air to produce the amount of cooling required at each point on the airfoil without waste of cooling air. Clearly, the flow through any given area of the vane can be reduced by increasing the spacing of the pores through the layers and by decreasing the size of the pores. Neither of these is entirely satisfactory in all cases, because increasing the spacing of the pores may impair the uniformity of cooling and decreasing the size of the pores leads to difficulties in achieving accurate control of the size of the pores and therefore the amount of flow at any given area.

Our invention is the result of the concept that alleviation of both of these difficulties may be achieved by putting the pores within the bosses instead of between the bosses as in prior structures and, furthermore, by having the pores discharge through the side walls of the bosses. It is thus feasible to provide a pore of sufficient size for ready photoetching and provide a ring-shaped boss around the pore for bonding to the adjacent sheet; and also quite feasible to etch away the top of the wall of the boss at a point so as to provide a lateral exit for the air flowing through the pore. Since the depth of the etch between the bosses which controls the height of the pores or the depth of etching at any local area is readily controlled, the dimension of the pore may be made relatively small without attempting to etch extremely fine diameter pores. Thus, by putting the pores within the bosses and employing the lateral inlet or outlet for flow of the cooling fluid through the side walls of the boss, very accurate control of the flow of cooling air over various areas of a cooled sheet such as the wall of a blade or vane may be achieved.

The principal objects of our invention are to improve the efficiency and reliability of turbomachines, to increase the temperature tolerance of such machines, to provide an improved material adapted for transpiration cooling, to improve the feasibility of zone control of cooling in a structure which is cooled by the transpiration method, and to improve the strength characteristics of structures such as turbine blades which are transpiration cooled.

The nature of our invention and its advantages will be clear to those skilled in the art from the succeeding detailed description of the preferred embodiment of the invention and the accompanying drawings thereof.

FIG. 1 is an elevation view of a transpiration cooled turbine blade.

FIG. 2 is a greatly enlarged sectional view through the laminated wall of the blade.

FIG. 3 is a sectional view taken on the plane indicated by the line 3—3 in FIG. 2.

FIG. 4 is an exploded fragmentary view illustrating the relation of the three layers of the laminate illustrated in FIGS. 2 and 3.

FIG. 5 is a fragmentary sectional view of a modification.

Referring to the drawings, FIG. 1 illustrates a turbine blade 6 including a flow-directing or airfoil portion 7, a platform 8, a stalk 10, and a root 11 adapted to be mounted in the rim of a rotor structure. The airfoil is hollow, with a formed porous sheet metal wall 12. Air may enter the interior of the blade through a hole 14 in the stalk and the tip of the blade is closed by a cap 15 welded in place. The wall 12 has numerous distributed small pores 16 through its outer surface from which the cooling air emerges after flowing through the wall 12. As so far described, the blade may be the same as that described in application No. 762,411 referred to above.

Our invention relates to the structure of the porous laminate which forms the wall 12 and which, of course, could be used in various situations for transpiration cooling. The nature of this laminate will be clear from FIGS. 2, 3, and 4. The wall or sheet 12 comprises three layers or laminae; a first or outer layer 18, a second or intermediate layer 19, and a third or inner layer 20. Additional layers may be provided but need not be illustrated, as they do not affect the principle of the invention. In some cases the inner layer 20 might be omitted but we prefer in most cases to have at least the three layers referred to above.

To give some idea of the scale involved here, the layers typically are about 0.010 of an inch thick before any etching or other machining. Thus, the wall 12 might be considered in a typical blade to be approximately 0.030 of an inch thick. The pores 16 through the outer layer 18, as well as pores and bosses to be described on the other sheets, are preferably obtained by a photoetching process. After the sheets have been etched or otherwise formed, they are united into the laminate by any suitable process, the most suitable so far with high temperature alloys being diffusion bonding.

As illustrated, layers 19 and 20 are identical in configuration, although they are not necessarily so. Each layer 19 and 20 bears an array of distributed bosses 22 which, as shown more clearly in FIG. 4, are preferably disposed in a rectangular pattern of rows and columns. With the three layer laminate shown, the bosses 22 of layer 20 are in register with the pores 16 of layer 18 and the bosses 22 of layer 19 are out of register with the pores 16, being disposed intermediate these pores so as to be disposed at the center of the squares defined by pores 16.

Cooling air or other cooling fluid flows through each layer 19 or 20 through small holes or pores which extend from the center of each boss through the boss and the body of layer 19 or 20 to the opposite side. The outlet for the air is defined by a channel 24 forming a continuation of the hole 23 extending out the side of the boss, the channel 24 being an area where the material of the boss is etched away at one side of the pore 23. As illustrated, this channel extends as deep as the etching which relieves the surface of the sheet to provide the relieved area or path 26 between the sheets for flow generally parallel to the layers. Thus, air can flow from the inner surface of the sheet through the holes 23, including channels 24, of the inner layer 20, through the space 26 between layers 20 and 19, then through the holes 23, 24 in the intermediate layer 19, and further through the space 26 between that layer and layer 18, and finally emerge from the layer or blade wall through the pores 16 in the outer layer 18.

It should be noted that the flow area of the pores may be controlled by the diameter of the hole portion 23 but also may be controlled by the width and depth of the channel portion 24. For example, if the channels 24 are etched to a lesser depth than indicated in FIGS. 3 and 4, the flow path is reduced. This can be accomplished by reducing the overall depth of the etching to provide the channels 24 and passages 26 or by selective etching to provide channels 24 shallower than the space between the relieved surface of the layer and the layer next to it. By varying the depth of the etching of the layers 19 and 20, or one of them, from point to point of the surface, the permeability of the material to flow of cooling air may be varied apart from variations which might otherwise be achieved by varying the spacing of the holes or the diameter of the hole portions 23.

In this connection, it is desirable to provide bosses 22 sufficiently close together to provide a reasonable degree of strength of the sheet, particularly for forming and to resist loads in use, by the bonding together of the sheets at points reasonably close together. Further control of the flow may be accomplished by omitting the holes 23 if desired or, more desirably, by omitting the channel portion 24 from some of the bosses. Also, by retaining the hole portion 23 through the boss only, the weight of the boss is reduced without any effect on the tensile load carrying capacity of the layer. In this case, the boss simply has a crater in the center rather than a hole extending entirely through the sheet such as normally is obtained by etching from both sides of the layer. This is illustrated by boss 28 in FIG. 5.

It should be apparent to those skilled in the art that the structure described has many advantages in point of strength and adaptability to various transpiration cooling requirements.

The detailed description of preferred embodiments of our invention for the purpose of explaining the principles thereof is not to be considered as limiting or restricting the invention, since many modifications may be made by the exercise of skill in the art.

We claim:

1. A laminated porous sheet adapted for transpiration cooling comprising a plural number of porous laminae bonded together in face-to-face relation, the surface of one of the two facing laminae at each interface between laminate having bosses distributed over the surface and projecting from the surface to create a space for flow of fluid between and generally parallel to the laminae, the laminae having through holes in register with the bosses each extending from the side of the lamina opposite the boss through the side of the boss to provide for flow of fluid from face to face of the laminated sheet.

2. A sheet as recited in claim 1 in which the laminae are composed of high temperature resisting metal.

3. A sheet as recited in claim 2 forming the surface of a flow-directing member of a turbine.

4. A sheet as recited in claim 2 defining the surface of a turbine blade.

5. A laminated porous metal sheet adapted for transpiration cooling comprising three laminae bonded together in face-to-face relation; at least one of the laminae at each interface between laminae bearing bosses distributed over its surface creating a gap between the laminae except at the bosses; each lamina having through pores distributed over its surface out of register with the pores of the next adjacent lamina or laminae; the pores through at least one lamina being in register with bosses on that lamina and extending inward from the side of the bosses.

6. A sheet as recited in claim 5 in which each said pore through the said one lamina includes a hole through the lamina within the boss and a channel across the top surface of the boss.

7. A sheet as recited in claim 6 in which the depth of the channel is substantially the height of the boss.

8. A sheet as recited in claim 6 in which the depth of at least some of the channels is less than the height of the corresponding boss.

9. A laminated porous metal sheet adapted for transpiration cooling comprising at least three metal layers bonded together face-to-face, the layers comprising a first layer at the outer surface of the sheet having pores through the layer distributed over the surface of the layer; a second layer bonded to the first layer having bosses projecting from and distributed over the surface of the second layer into contact with the first layer, the bosses being out of register with the pores in the first layer, the second layer having pores through the layer emerging through the bosses; and a third layer of similar configuration to the second layer bonded to the second layer with the bosses out of register with the holes through the second layer.

10. A sheet as recited in claim 9 in which the pores emerge as channels traversing the wall of the bosses.

11. A sheet as recited in claim 10 in the form of an airfoil member of a turbine.

References Cited

UNITED STATES PATENTS

| | | | |
|---|---|---|---|
| 2,616,671 | 11/1952 | Wakeman | 165—167 |
| 2,870,700 | 1/1959 | Harrington | 161—112 |
| 3,046,758 | 7/1962 | Heuer et al. | 165—Exp. Metal. |
| 3,067,982 | 12/1962 | Wheeler | 416—90 |
| 3,240,468 | 3/1966 | Watts et al. | 416—231X |
| 3,402,914 | 9/1968 | Kump et al. | 416—231 |
| 3,411,794 | 11/1968 | Allen | 416—95UX |

EVERETTE A. POWELL, JR., Primary Examiner

U.S. Cl. X.R.

416—97, 231